United States Patent [19]

Watabe et al.

[11] Patent Number: 5,290,912

[45] Date of Patent: Mar. 1, 1994

[54] PROCESS FOR PRODUCING A POLYOXYALKYLENE COMPOUND

[75] Inventors: Takashi Watabe, Yokohama; Hiromitsu Takeyasu, Tokyo; Shigeyuki Kozawa, Yokohama, all of Japan

[73] Assignee: Asahi Glass Company Ltd., Tokyo, Japan

[21] Appl. No.: 778,953

[22] PCT Filed: May 10, 1991

[86] PCT No.: PCT/JP91/00624

§ 371 Date: Jan. 10, 1992

§ 102(e) Date: Jan. 10, 1992

[87] PCT Pub. No.: WO91/18038

PCT Pub. Date: Nov. 28, 1991

[30] Foreign Application Priority Data

May 11, 1990 [JP] Japan .................. 2-120112

[51] Int. Cl.$^5$ .................. C08G 65/00; C08G 65/26; C07C 41/02; C07C 41/03

[52] U.S. Cl. .................. 528/405; 528/409; 528/410; 528/412; 528/413; 528/414; 528/415; 528/416; 528/419; 528/421; 568/583; 568/589; 568/590; 568/591; 568/593; 568/594; 568/599; 568/601; 568/604; 568/606; 568/611; 568/612; 568/615; 568/618; 568/620; 568/622; 568/623; 568/624; 568/625

[58] Field of Search .............. 528/405, 409, 410, 412, 528/413, 414, 415, 416, 419, 421; 568/583, 589, 590, 591, 593, 594, 599, 601, 604, 606, 611, 612, 615, 618, 620, 622, 623, 624, 625

[56] References Cited

U.S. PATENT DOCUMENTS

| | | | |
|---|---|---|---|
| 3,278,457 | 2/1963 | Milgrom | 528/412 |
| 3,829,505 | 8/1974 | Herold | 528/76 |
| 3,941,849 | 3/1976 | Herold | 528/86 |
| 4,472,560 | 9/1984 | Kuyper et al. | 526/120 |
| 4,477,589 | 10/1984 | van der Hulst et al. | 502/169 |
| 4,843,054 | 6/1989 | Harper | 502/175 |
| 5,002,678 | 3/1991 | Vanover et al. | 568/614 |

FOREIGN PATENT DOCUMENTS

| | | |
|---|---|---|
| 1351228 | 12/1963 | France . |
| 44-551 | 1/1969 | Japan . |
| 58-185433 | 10/1983 | Japan . |
| 58-185621 | 10/1983 | Japan . |
| 59-15336 | 4/1984 | Japan . |
| 63-277236 | 11/1988 | Japan . |
| 2085457 | 7/1981 | United Kingdom . |

OTHER PUBLICATIONS

Patent Abstracts of Japan, vol. 11, No. 96, (C-412) [2543], Mar. 26, 1987, & JP-A-61-247737, Nov. 5, 1986, N. Nakasugi, et al., "Production of Modified Silicone Diol".

Journal of Polymer Science, Polymer Chemistry Edition, vol. 19, Nov., 1981, pp. 2977-2985, S. Hayase, et al., "Polymerization of Cyclohexene Oxide with Aluminum Complex-Silanol Catalysts. Part III".

Patent Abstracts of Japan, vol. 14, No. 47, (C-682) [3990], Jan. 29, 1990, & JP-A-1-278529, Nov. 8, 1989, T. Endo, et al., "Ring-Opening of Heterocyclic Compound and Polymerization Thereof".

*Primary Examiner*—Maurice J. Welsh
*Assistant Examiner*—Rabon Sergent
*Attorney, Agent, or Firm*—Oblon, Spivak, McClelland, Maier & Neustadt

[57] ABSTRACT

The present invention has an object of producing a polyoxyalkylene compound by ring-opening polymerization of an alkylene oxide to a certain specific highly hydrophobic initiator. The present invention provides a process for producing a polyoxyalkylene compound, characterized in that the polyoxyalkylene compound is produced by ring-opening polymerization of an alkylene oxide, in the presence of a plural metal cyanide complex catalyst, with an initiator selected from an organopolysiloxane compound having an active hydrogen-containing functional group to which an alkylene oxide is reactive, and a fluorine-containing compound having such an active hydrogen-containing functional group and a fluorinated hydrocarbon group.

7 Claims, No Drawings

PROCESS FOR PRODUCING A POLYOXYALKYLENE COMPOUND

TECHNICAL FIELD

The present invention relates to a process for producing a polyoxyalkylene compound having an organopolysiloxane residue and a fluorinated hydrocarbon group.

BACKGROUND ART

A polyoxyalkylene compound produced by ring-opening polymerization of an alkylene oxide such as propylene oxide or ethylene oxide to an initiator having at least one active hydrogen-containing functional group to which an alkylene oxide is reactive, is industrially useful, for example, as a polyol component to be used in the polyurethane industry or as a surfactant and a starting material thereof. Such a polyoxyalkylene compound may be prepared to have various characteristics by selecting the initiator to be used.

As the initiator, a compound having a hydroxyl group is the commonest compound. As a catalyst for the ring-opening polymerization of an alkylene oxide, an alkali catalyst such as an alkali metal hydroxide is widely employed. The alkali catalyst reacts with a hydroxyl group of the initiator or with a hydroxyl group formed afresh by a reaction of an alkylene oxide, to form an alkali metal alkoxide, and this alkali metal ion is believed to serve as a catalyst.

A polyoxyalkylene compound obtainable by ring-opening polymerization of an alkylene oxide to an initiator having an organopolysiloxane structure or to an initiator having a fluorinated hydrocarbon group, is useful as a starting material for various synthetic resins, as a modifier or as an additive, and it is expected to provide such characteristics as improvement of weather resistance or water resistance, a tack-reducing effect or improvement of self-releasing properties. However, when such a highly hydrophobic initiator is used, the ring-opening addition reaction of an alkylene oxide to the active hydrogen-containing functional group of the initiator tends to be remarkably disadvantageous with the conventional alkali catalyst.

When an alkali catalyst is added to a highly hydrophobic initiator, the compatibility of the initiator and the alkali catalyst is poor, and the two do not easily react to each other. Therefore, the hydroxyl group of the initiator tends to be hardly converted to an alkali metal alkoxide, and an alkylene oxide is hardly reactive to such a hydroxyl group. Therefore, the alkali catalyst itself such as the alkali metal hydroxide or the existing water is likely to act as an initiator, whereby it happens that a polyoxyalkylene glycol which is not bonded to the highly hydrophobic initiator, will form as a by-product. Further, there is a problem that if the temperature in the system is brought to a high level of at least 100° C. in the presence of an alkali metal hydroxide, a decomposition reaction of the organopolysiloxane is likely to occur. Further, there is a compound instable to an alkali catalyst, such as a partially fluorinated alkanol.

It is known to use an acid catalyst such as boron trifluoride instead of the alkali catalyst. However, use of an acid catalyst has a problem such that a homopolymer of the alkylene oxide is likely to be formed as a by-product, and it is difficult to obtain a polyoxyalkylene compound of a high molecular weight.

DISCLOSURE OF THE INVENTION

The present invention has an object of producing a polyoxyalkylene compound by ring-opening polymerization of an alkylene oxide to such a highly hydrophobic initiator as mentioned above.

The present invention is the following invention relating to a process for producing a polyoxyalkylene compound by ring-opening polymerization of an alkylene oxide, in the presence of a plural metal cyanide complex, to an initiator composed of an organopolysiloxane compound or a fluorine-containing compound having a fluorinated hydrocarbon group:

A process for producing a polyoxyalkylene compound, characterized in that the polyoxyalkylene compound is produced by ring-opening polymerization of an alkylene oxide, in the presence of a plural metal cyanide complex catalyst, to an initiator selected from an organopolysiloxane compound having an active hydrogen-containing functional group to which an alkylene oxide is reactive, and a fluorine-containing compound having such an active hydrogen-containing functional group and a fluorinated hydrocarbon group.

The plural metal cyanide complex catalyst in the present invention is a complex containing at least two metals and having cyan ions on part or all of ligands and the one having an ability of catalyzing the ring-opening polymerization reaction of an alkylene oxide. Specifically, it includes, for example, a hexacyanocobaltzinc complex such as a hexacyanocobaltzinc-glyme complex as disclosed in Japanese Examined Patent Publication No. 15336/1984 and other plural metal cyanide complex catalysts as disclosed in U.S. Pat. Nos. 3,278,457, 3,278,458 and 3,278,459. Such a catalyst is known to show a high catalytic activity to ring-opening polymerization of an alkylene oxide. However, such a catalyst has not been known as a catalyst for polymerization of an alkylene oxide in which a highly hydrophobic initiator is employed which has an organopolysiloxane structure or a fluorinated hydrocarbon group in its molecule.

The plural metal cyanide complex in the present invention is believed to have a structure of the following formula (1) as disclosed in the above prior art references:

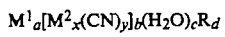

$$M^1{}_a[M^2{}_x(CN)_y]_b(H_2O)_cR_d$$

wherein $M^1$ is a metal ion such as Zn(II), Fe(II), Fe(III), Co(II), Ni(II), Al(III), Sr(II), Mn(II), Cr(III), Cu(IgI), Sn(II), Pb(II), Mo(IV), Mo(VI), W(IV) or W(VI), and $M^2$ is a metal ion such as Fe(II), Fe(III), Co(II), Co(III), Cr(II), Cr(III), Mn(II), Mn(III), Ni(II), V(IV) or V(V), and R is an organic ligand, a, b, x and y are positive integers which vary depending upon the valence and the number of coordination of the metal.

In the plural metal cyanide complex of the above chemical formula, $M^1$ is preferably Zn(II), and $M^2$ is preferably Fe(II), Fe(III), Co(II) or Co(III). The organic ligand may be, for example, a ketone, an ether, an aldehyde, an ester, an alcohol, an amide, a nitrile or a sulfide.

Particularly preferred as the plural metal cyanide complex is a hexacyanocobaltzinc complex. Further, a catalyst having a hexacyanocobaltzinc complex combined with other plural metal cyanide complex, may be employed. Such a combination may be a combination of metal components or may be a mixture of at least two catalysts.

The plural metal cyanide complex of the above chemical formula can be prepared by mixing aqueous solutions or solutions in a solvent mixture of water and an organic solvent of a metal salt $M^1 Y_a$ ($M^1$ and a are as defined above, and Y is an anion which forms a salt with $M^1$) and a polycyano metalate (salt) $Ze[M^2{}_x(CN)_y]_f$ ($M^2$, x and y are as defined above, Z is hydrogen, an alkali metal, an alkaline earth metal, etc., and e and f are positive integers determined by the valence of Z and $M^2$ and the number of coordination), contacting a plural metal cyanide thereby obtained, with an organic ligand R, and then removing any excess solvent and organic ligand R.

In the polycyano metalate (salt) $Ze[M^2{}_x(CN)_y]_f$, hydrogen or various metals including alkali metals, may be used for Z. As an alkali metal salt, a lithium salt, a sodium salt, a potassium salt, a magnesium salt or a calcium salt is preferred. Particularly preferred is a usual alkali metal salt such as a sodium salt or a potassium salt. As a metal salt, a metal halide compound is preferred, and, for example, zinc chloride or the like is suitable.

The alkylene oxide useful for the ring opening polymerization reaction in the present invention may be any alkylene oxide which can be polymerized by the plural metal cyanide complex catalyst. Specifically, it may be, for example, ethylene oxide, propylene oxide, 1-butene oxide, 2-butene oxide, isobutene oxide, 1-hexene oxide, cyclohexene oxide, phenylglycidyl ether, allylglycidyl ether or styrene oxide. A particularly preferred alkylene oxide is a $C_{2-4}$ alkylene oxide such as ethylene oxide, propylene oxide, 1-butene oxide, 2-butene oxide or iso-butene oxide. Two or more of such alkylene oxides may be used in combination. In such a case, two or more alkylene oxides may be reacted in a mixed state or may be sequentially reacted separately.

The compound which is used as an initiator in the present invention and which has an active hydrogen-containing functional group to which an alkylene oxide is reactive, is a compound having in its molecule at least one active hydrogen-containing functional group which serves as an initiation point of the polymerization of the alkylene oxide. This active hydrogen-containing functional group is a functional group having one or two hydrogen atoms to which an alkylene oxide is reactive, such as a hydroxyl group, a mercapto group, a primary amino group, a secondary amino group and a carboxyl group. The number of functional groups per molecule of this compound is preferably at most 10. Particularly preferred is a compound having from 1 to 6 such functional groups. The alkylene oxide is reacted in an amount of at least one molecule, particularly at least two molecules, per the active hydrogen of such an active hydrogen-containing functional group.

The organopolysiloxane compound is a polymer of a siloxane having at least one organic group bonded thereto, and at least one such organic group is an organic group having an active hydrogen-containing functional group. The organic group having an active hydrogen-containing functional group may be present at least at one of two terminals of the molecule, or may be present at an intermediate position of the molecular chain. This polyorganosiloxane compound may be a low polymer of e.g. an organodisiloxane compound There is no particular limit as to the upper limit in the number of polymerization units, but the number is preferably 500, particularly 200.

It is preferred that two organic groups are bonded to a silicon atom other than at both terminals of the organopolysiloxane compound. As such organic groups other than organic groups having active hydrogen-containing functional groups, hydrocarbon groups are preferred. As such hydrocarbon groups, alkyl groups, alkenyl groups or aryl groups are preferred. Particularly preferred are alkyl groups having at most 4 carbon atoms (hereinafter referred to also as lower alkyl groups) and phenyl groups. Most preferred are methyl groups. It is preferred that three organic groups are bonded to a silicon atom at each terminal, and the organic groups other than organic groups having active hydrogen-containing functional groups are preferably hydrocarbon groups as mentioned above. Further, at least one of the three organic groups may be a long chain hydrocarbon group.

The organic group having an active hydrogen-containing functional group is preferably a $C_{3-10}$ hydrocarbon group containing one or more functional groups of at least one type selected from —OH, SH, —NH$_2$ —NHR$^4$ and —CO$_2$H. Further, it may contain a linking group such as an ether bond, a thioether bond or an amino bond. This organic group preferably has from 1 to 4 active hydrogen-containing functional groups.

Specifically, as such an organopolysiloxane compound, compounds of the following formulas (1) to (3) are preferred:

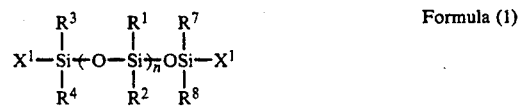

Formula (1)

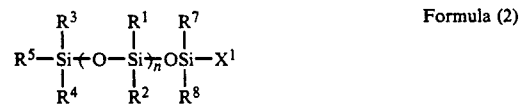

Formula (2)

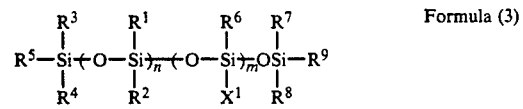

Formula (3)

(in the formulas, $X^1$ is a $C_{3-10}$ hydrocarbon group containing at least one functional group of at least one type selected from —OH, —SH, —NH$_2$, —NHR$^{10}$ and —CO$_2$H, which may contain an ether bond, a thioether bond or an amino bond, $R^1$, $R^2$, $R^3$, $R^4$, $R^6$, $R^7$, $R^8$ and $R^{10}$ are, respectively, the same or different $C_{1-6}$ hydrocarbon groups, $R^5$ and $R^9$ are $C_{1-18}$ hydrocarbon groups, n is 0 or an integer of from 1 to 200, and m is an integer of from 1 to 10.)

In the above formulas, each of $R^1$ and $R^2$ is preferably a lower alkyl group, particularly a methyl group. Likewise, each of $R^3$ to $R^{10}$ is preferably a lower alkyl group. $X^1$ is, for example, preferably a hydroxyalkyl group, a dihydroxyalkyl group, a hydroxyalkoxy-substituted alkyl group, a mercaptoalkyl group, an aminoalkyl group, an N-aminoalkyl-substituted aminoalkyl group or a carboxyalkyl group.

In the present invention, the initiator made of a fluorine-containing compound having an active hydrogen-containing functional group to which an alkylene oxide is reactive and a fluorinated hydrocarbon group, is a compound having an active hydrogen-containing functional group as described above and a monovalent or higher valent hydrocarbon group having at least one fluorine atom. A preferred fluorinated hydrocarbon group is a monovalent or bivalent fluorinated hydrocarbon group having at least two fluorine atoms. Specifically, for example, a polyfluoroalkyl group, a polyfluoroalkylene group or a polyfluoroaryl group is preferred. The number of carbon atoms thereof is preferably from 1 to 20, particularly from 3 to 16.

The polyfluoroalkyl group is preferably a polyfluoroalkyl group having a perfluoroalkyl moiety. This polyfluroalkyl group having a perfluoroalkyl moiety is a polyfluoroalkyl group f the formula $R_f^1$—$^{11}$—. This $R_f^1$ is a linear or branched perfluoroalkyl group having at least one carbon atom, particularly a linear $C_{3-20}$ perfluoroalkyl group. $R^{11}$ is an alkylene group containing no fluorine atom, particularly preferably a $C_{2-6}$ polymethylene group. Further, the polyfluoroalkyl group may be a perfluoroalkyl moiety ($R_f^1$—) of a perfluorocarboxylic acid ($R_f^1$—COOH) or its derivative such as an an ester or amide.

The polyfluoroalkylene group is preferably a polyfluoroalkylene group having a perfluoroalkylene moiety. This polyfluoroalkylene group having a perfluoroalkylene moiety is a polyfluoroalkylene group of the formula —$R^{12}$—$R_f^2$—$R^{13}$—. This $R_f^2$ is a perfluoroalkylene group having at least two carbon atoms, particularly preferably a $C_{2-12}$ perfluoroalkylene group. Each of $R^{12}$ and $R^{13}$ which are independent from each other, is an alkylene group containing no fluorine atom, particularly preferably a $C_{2-6}$ polymethylene group.

The polyfluoroaryl group may be a phenyl group or an alkyl-substituted phenyl group, with at least two fluorine atoms bonded to the phenyl group, particularly preferably a polyfluorophenyl group having all unsubstituted positions of the phenyl group substituted by fluorine atoms. Further, the substituent may be a polyfluoroalkyl group such as a trifluoromethyl group.

Further, the polyfluoroalkyl group or the polyfluoroalkylene group may be in such a form that part of carbon atoms of the carbon chain is substituted by an ether-type oxygen atom or a thioether-type sulfur atom, such as a polyfluoroxalkyl group, a polyfluoroxalkylene group, polyflorothioxalkyl group or a polyfluorothioxalkylene group. For example, it may be a perfluoroxalkyl group of the formula $R_f^1$—(OCF$_2$CF(CF$_3$))$_k$— (k is an integer of at least 1).

The active hydrogen-containing functional group and the fluorinated hydrocarbon group may be directly bonded or may be bonded by an organic group such as a hydrocarbon group interposed therebetween. Such an organic group may contain an ether group, an ester group, an amide group, a carbamate group, a urea group, a carbonate group, etc.

More preferred compounds are compounds of the following formulas (4) to (8):

$R_f^1$—$R^{11}$—$X^2$ (4)

$R_f^1$—COOX$^3$ (5)

$R_f^1$—CON(R$^{14}$)—$X^3$ (6)

$X^2$—$R^{12}R_f^2$—$R^{13}$—$X^2$ (7)

$(R_f^1)_t$—C$_6$—F$_{5-t}$—$X^2$ (8)

(in the formulas, $X^2$ is an active hydrogen-containing functional group selected from —OH, —SH, —NH$_2$, —NHR$^4$ and —CO$_2$H, or a hydrocarbon group having at least one such functional group, $X^3$ is a hydrogen atom or a hydrocarbon group having at least one of the above mentioned active hydrogen-containing functional groups, R$^{14}$ is a hydrogen atom or a $C_{1-6}$ hydrocarbon group, $R_f^1$, $R_f^2$, $R^{11}$, $R^{12}$ and $R^{13}$ are the above mentioned groups, and t is 0 or an integer of from 1 to 3.)

Specific fluorine-containing compounds include, for example, 4,4'-(hexafluoroisopropylidene)diphenol, tetrafluorohydroquinone, pentafluorophenol, pentafluorothiophenol, pentafluorobenzoic acid, pentafluorobenzyl alcohol, pentafluoroaniline and hexafluoro-2-propanol.

Further, there are compounds of the following formulas (9) to (13):

$CF_3(CF_2)_p(CH_2)_qX^4$ (9)

$CF_3(CF_2)_pCH_2CHCH_2OH$ (10)
$\qquad\qquad\qquad |$
$\qquad\qquad\qquad OH$ $X^4(CH_2)_q(CF_2)_r(CH_2)_qX^4$ (11)

$CF_3(CF_2)_pCH_2CH_2$—CH(CH$_2$OH)$_2$ (12)

$\qquad\quad CF_3 \qquad\qquad\qquad CF_3$ (13)
$\qquad\quad |\qquad\qquad\qquad\quad |$
$HOCH_2$—(CFOCF$_2$)$_r$—(CF$_2$)$_2$—(CF$_2$OCF)$_r$—CH$_2$OH (in the formulas, X$^4$ is an active hydrogen-containing functional group selected from —OH, —SH, —NH$_2$, —NHR$^{15}$ and —CO$_2$H, R$^{15}$ is a $C_{1-6}$ hydrocarbon group, p is 0 or an integer of from 1 to 16, and each of q and r is an integer of from 2 to 6.)

Further, a compound obtained by bonding the above-mentioned specific fluorine-containing compound as a starting material to other active hydrogen-containing compound by an ester group, an amide group, a carbamate group, a urea group or a carbonate group, can also be used as an initiator for the polymerization of an alkylene oxide. As such a compound, for example, the following reaction products may be mentioned.

A hydroxyl group-containing compound obtained by reacting the above fluorine-containing compound with a polyisocyanate compound in an excess of isocyanate groups, followed by reacting with a polyhydroxy compound under such a condition that hydroxyl groups are in excess. A carboxyl group-containing compound obtained by reacting the above-mentioned fluorine-containing compound containing a hydroxyl group with an excess equivalent of a polycarboxylic acid compound or an acid anhydride. A hydroxyl group-containing ester compound obtained by condensing a polyfluoroalkylenecarboxylic acid or its ester compound with a polyhydroxy compound under such a condition that hydroxyl groups are in excess. A hydroxyl group-containing amide compound obtained by condensing a polyfluoroalkylcarboxylic acid or its ester compound with an alkanolamine under such a condition that hydroxyl groups are in excess.

The actual polymerization reaction may be conducted by heating a mixture comprising the initiator, the plural metal cyanide complex and the alkylene oxide in a nitrogen atmosphere to the polymerization reaction temperature. At that time, the alkylene oxide may be added at once or may be gradually added while watching the progress of the reaction. Further, as mentioned above, when two or more alkylene oxides are polymerized, a block copolymer or a random copolymer may optionally be produced by controlling the method of their addition. Namely, when a mixture of two or more alkylene oxides is added, a random copolymer will be obtained. On the other hand, when two or more alkylene oxides are added one after another after completion of the respective polymerization reactions, a block copolymer can be produced.

The temperature for the polymerization reaction is suitably from 20° to 180° C., preferably from 60° to 130° C. This polymerization reaction may be conducted by using or not using a solvent. As the solvent useful in the present invention, an ether-type, hydrocarbon-type, halogenated hydrocarbon-type, ketone-type, amide-type or ester-type solvent may be mentioned. Particularly preferred is an ether-type or ketone-type solvent. Specifically, tetrahydrofuran, diethyl ether, 1,2-dimethoxyethane, 1,2-dimethoxypropane, diethylene glycol dimethyl ether, methyltetrahydrofuran, dioxane, acetone or methyl ethyl ketone may be mentioned. The solvent can be recovered after completion of the reaction by distillation from the reaction mixture.

It is believed that since the plural metal cyanide complex catalyst is likely to coordinate with an active hydrogen group in the present invention, it is possible to easily conduct the polymerization of an alkylene oxide even in a case where an initiator having in its molecule a highly hydrophobic organopolysiloxane structure or a fluorinated hydrocarbon group is used, which used to be hardly useful for the ring opening polymerization of an alkylene oxide where the conventional alkali metal hydroxide is used as a catalyst. Further, with the plural metal cyanide complex catalyst of the present invention, decomposition of the organopolysiloxane structure or decomposition of the partially fluorinated alkanol will not occur.

EXAMPLES

The present invention will be described in detail with reference to the following Examples. However, it should be understood that the present invention is by no means restricted to such Examples.

Example 1

500 g of α,ω-bis[3-(2-hydroxyethoxy)propyl]-polydimethylsiloxane of the following formula having a molecular weight of about 1,800 and 0.1 g of hexacyanocobaltzinc-glyme complex were charged into an autoclave and heated to bring the internal temperature to 100° C. under a nitrogen atmosphere. Then, 1.5 kg of propylene oxide was introduced so that the internal temperature would not exceed 120° C., and reacted. After completion of the introduction of propylene oxide, the mixture was further stirred at the same temperature for one hour. Then, an unreacted monomer was distilled off under reduced pressure to obtain 2.5 kg of a slightly turbid oily substance.

By the GPC analysis, the product showed a single peak which is different from the starting material polydimethylsiloxane, and its hydroxyl value was 12.9 mgKOH/g. The obtained oily substance did not undergo separation even after being stored for three months at 25° C.

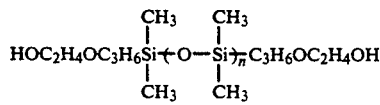

Example 2

25 g of 1-(3-mercaptopropyl)-1,1,3,3,3-pentamethyldisiloxane was dissolved in 25 g of tetrahydrofuran, and 0.05 g of hexacyanocobaltzinc-glyme complex was added thereto, and the mixture was charged into an autoclave. Further, 50 g of propylene oxide was added thereto, and the mixture was heated to 100° C. under a nitrogen atmosphere, whereby an exothermic reaction took place. After completion of the heat generation, the mixture was further heated for 30 minutes at 100° C. Then, an unreacted monomer was removed under reduced pressure to obtain 74.8 g of an oily substance. By the GPC analysis, the product showed a single peak.

Example 3

0.02 g of hexacyanocobaltzinc-glyme complex was added to a mixture comprising 100 g of α,ω-bis(3-mercaptopropyl)-polydimethylsiloxane having an average molecular weight of 876 and 100 g of tetrahydrofuran, and the mixture was heated in an autoclave at 100° C. under a nitrogen atmosphere. To the autoclave, a mixture comprising 200 g of propylene oxide and 100 g of ethylene oxide, was gradually introduced so that the internal temperature would not exceed 120° C. After completion of the introduction of the monomer, the mixture was heated for further one hour. Then, the solvent was distilled off under reduced pressure to obtain 498 g of an oily substance.

By the GPC analysis, the product showed a single peak, and the hydroxyl value was 26.5 mgKOH/g. The obtained oily substance did not undergo separation even after being stored for 3 months at 25° C.

Example 4

A mixture comprising 25 g of α,ω-bis(3-aminopropyl)polydimethylsiloxane having an average molecular weight of 800 and 5 g of propylene oxide, was heated in an autoclave at 120° C. for 2 hours. An unreacted monomer was removed, and the reaction mixture was cooled to room temperature. Then, 0.01 g of hexacyanocobaltzinc-glyme complex and 50 g of tetrahydrofuran were added thereto, and 50 g of propylene oxide was gradually introduced under a nitrogen atmosphere so that the internal temperature would not exceed 120° C. After completion of the introduction of the monomer, the mixture was heated for further one hour. Then, the solvent and an unreacted monomer were distilled off under reduced pressure to obtain 75.1 g of an oily substance.

By the GPC analysis, the product showed a single peak, and its hydroxyl value was 95.0 mgKOH/g.

Example 5

50 g of α-methyl-ω-3-(2,2-bis(hydroxymethyl)butoxy)propylpolydimethylsiloxane of the following formula having an average molecular weight of 2,000 and 0.02 g of hexacyanocobaltzinc-glyme complex were charged into an autoclave and heated to 100° C. under a nitrogen atmosphere. A mixture comprising 100 g of propylene oxide and 30 g 1-butene oxide was gradually introduced so that the internal temperature would not exceed 120° C. and reacted. After completion of the introduction of the alkylene oxides, the mixture was heated at the same temperature for further one hour. Then, an unreacted monomer was removed to obtain 180 g of an oily substance.

By the GPC analysis, the product showed a single peak, and its hydroxyl value was 14.5 mgKOH/g. The obtained oily substance did not underwent separation even after being stored at 25° C. for three months.

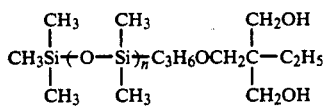

Example 6

50 g of α,ω-bismethylpolydimethylsilyloxy-polymethyl-3-(2-hydroxyethyl)propylsiloxane of the following formula having a molecular weight of of 5,000 and a hydroxyl value of 27 mgKOH/g and 0.02 g of hexacyanocobaltzinc-glyme complex were charged into an autoclave and heated to 100° C. under a nitrogen atmosphere. 150 g of propylene oxide was gradually added so that the internal temperature would not exceed 120° C. and reacted. After completion of the introduction of propylene oxide, the mixture was heated at the same temperature for further one hour. Then, an unreacted monomer was removed to obtain 200 g of an oily substance.

By the GPC analysis, the product showed a single peak, and its hydroxyl value was 7.0 mgKOH/g. The obtained oily substance did not undergo separation even after being stored at 25° C. for three months.

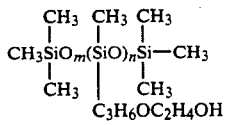

Example 7

5 g of 1,1,1-trifluoroethanol was dissolved in 30 g of tetrahydrofuran, and the solution was charged into an autoclave. 20 mg of hexacyanocobaltzinc-glyme complex was added, and 25 g of propylene oxide was added. The autoclave was substituted by nitrogen and heated to 100° C., whereby the internal temperature rose to 140° C. by an exothermic reaction. Thereafter, the mixture was heated at 100° C. for further 30 minutes, and then cooled to room temperature. The solvent was distilled off under reduced pressure to obtain 29.95 g of an oily substance. By the GPC analysis, the product showed a single peak, and its hydroxyl value was 94.5 mgKOH/g.

Example 8

15.0 g of tridecafluoroctanol ($C_6F_{13}C_2H_4OH$), was dissolved in 50 g of tetrahydrofuran, and the solution was charged into an autoclave. 30 mg of hexacyanocobaltzinc-glyme complex was added, and 25 g of propylene oxide was added. Then, in accordance with Example 7, the mixture was reacted at 100° C. to obtain 40.0 g of an oily product. By the GPC analysis, this product showed a single peak, and its hydroxyl value was 58.2 mgKOH/g.

Example 9

30.0 g of tridecafluoroctanol ($C_6F_{13}C_2H_4OH$), was dissolved in 100 g of tetrahydrofuran, and the solution was charged into an autoclave. 50 mg of hexacyanocobaltzinc-glyme complex was added, and the autoclave was substituted by nitrogen and pressurized under a nitrogen pressure of 1 kg/cm². The autoclave was heated to 100° C., and a mixture comprising 30 g of propylene oxide and 70 g of ethylene oxide was gradually introduced so that the internal temperature would not exceed 110° C. and reacted. After completion of the introduction of alkylene oxides, the mixture was left to stand at the same temperature for one hour. Then, the solvent was distilled off under reduced pressure to obtain 129.5 g of an oily product. By the GPC analysis, the product showed a single peak, and its hydroxyl value was 58.2 mgKOH/g.

Example 10

5 g of 3,3,4,4,5,5,6,6-octafluoro-1,8-octanediol was dissolved in 40 g of 1,2-dimethoxyethane, and the solution was charged into an autoclave. 25 mg of hexacyanocobaltzinc-glyme complex was added, and the autoclave was substituted by nitrogen. The autoclave was heated to 100° C., and 200 g of propylene oxide was gradually introduced so that the internal temperature would not exceed 120° C. and reacted. After completion of the introduction of propylene oxide, the mixture was left at the same temperature for one hour. Then, the solvent was distilled off under reduced pressure to obtain 203.5 g of an oily product. By the GPC analysis, the product showed a single peak, and its hydroxyl value was 9.8 mgKOH/g.

Example 11

20 g of pentadecafluorodecanediol [$CF_3(CF_2)_6CH_2CH(OH)CH_2OH$] was dissolved in 60 g of tetrahydrofuran, and the solution was charged into an autoclave. Then, 100 mg of hexacyanocobaltzinc-glyme complex was added, and the autoclave was substituted by nitrogen. The autoclave was heated to 100° C., and 340 g of propylene oxide was gradually introduced so that the internal temperature would not exceed 120° C., and reacted. After the introduction of propylene oxide, the mixture was left at the same temperature for 30 minutes. Then, 90 g of 1-butene oxide was further added so that the internal temperature would not exceed 120° C. and reacted. After completion of the introduction of 1-butene oxide, the mixture was heated at the same temperature for further one hour. The solvent was distilled off under reduced pressure to obtain 448 g of an oily product. By the GPC analysis, the product showed a single peak, and its hydroxyl value was 11.7 mgKOH/g.

Example 12

5 g of pentafluoroaniline ($C_6F_5NH_2$) was dissolved in 50 g of tetrahydrofuran, and the solution was charged into an autoclave. 50 g of hexacyanocobaltzinc-glyme complex was added, and the autoclave was substituted by nitrogen. The autoclave was heated to 100° C., and 340 g of propylene oxide was gradually added so that the internal temperature would not exceed 120° C. and reacted. After the introduction of the propylene oxide, the mixture was left at the same temperature for one hour. Then, the solvent was distilled off under reduced pressure to obtain 104.5 g of an oily product. By the GPC analysis, the product showed a single peak, and its hydroxyl value was 30.5 mgKOH/g.

Example 13

5 g of pentafluorothiophenol ($C_6F_5SH$) was dissolved in 50 g of tetrahydrofuran, and the solution was charged into an autoclave. 50 mg of hexacyanocobaltzinc-glyme complex was added and the autoclave was substituted by nitrogen. The autoclave was heated to 100° C., and 50 g of propylene oxide was gradually added so that the internal temperature would not exceed 120° C., and reacted. After the introduction of propylene oxide, the mixture was left at the same temperature for one hour. Then, the solvent was distilled off under reduced pressure to obtain 54.2 g of an oily product. By the GPC analysis, the product showed a single peak, and its hydroxyl value was 26.3 mgKOH/g.

Example 14

15.0 g of tridecafluoroctylic acid ($C_6F_{13}CH_2CO_2H$) was dissolved in 50 g of tetrahydrofuran, and the solution was charged into an autoclave. 50 mg of hexacyanocobaltzinc-glyme complex was added and the autoclave was substituted by nitrogen. The autoclave was heated to 100° C., and 50 g of propylene oxide was gradually introduced so that the internal temperature would not exceed 120° C., and reacted. After completion of the introduction, the mixture was left at the same temperature for one hour. Then, the solvent was distilled off under reduced pressure to obtain 64.8 g of an oily product. By the GPC analysis, the product showed a single peak, and its hydroxyl value was 35.0 mgKOH/g.

Example 15

5 g of N-tridecafluoropentanoyl-1,1-dihydroxymethylpropylamide [$CF_3(CF_2)_5CONC(CH_2OH)_2CH_2CH_3$] was dissolved in 30 g of tetrahydrofuran, and the solution was charged into an autoclave. 0.1 g of hexacyanocobaltzinc-glyme complex was added, and 30 g of propylene oxide was added, and the autoclave was substituted by nitrogen. Then, in the same operation as in Example 7, 34.8 g of a product was obtained. By the GPC analysis, the product showed a single peak, and its hydroxyl value was 35.8 mgKOH/g.

What is claimed is:

1. A process for producing a polyoxyalkylene compound, comprising ring-opening polymerizing an alkylene oxide, in the presence of a plural metal cyanide complex catalyst, with an initiator selected from the group consisting of an organopolysiloxane compound, wherein said organopolysiloxane compound is a polymer of a siloxane having at least one organic group bonded thereto and wherein at least one of said organic groups is an organic group having an active hydrogen-containing functional group, and a fluorine-containing compound selected from the group consisting of a compound of one of the following chemical formulae (4) to (8):

 (4),

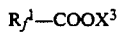 (5),

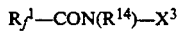 (6),

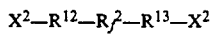 (7) and

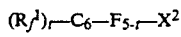 (8)

wherein $X^2$ is an active hydrogen-containing functional group selected from the group consisting of —OH, —SH, —$NH_2$, —$NHR^{14}$ and —$CO_2H$, or a hydrocarbon group having at least one such functional group, $X^3$ is a hydrogen atom or a hydrocarbon group having at least one of the above active hydrogen-containing functional groups, $R^{14}$ is a hydrogen atom or a $C_{1-6}$ hydrocarbon group, $R_f^1$ is a perfluoroalkyl group of at least one carbon atom, $R_f^2$ is a perfluoroalkylene group of at least 2 carbon atoms, $R^{11}$ is an alkylene group containing no fluorine atom, each of $R^{12}$ and $R^{13}$ which are independent from each other, is an alkylene group containing no fluorine atom, and t is 0 or an integer of from 1 to 3.

2. The process according to claim 1, wherein the alkylene oxide is a $C_{2-4}$ alkylene oxide.

3. The process according to claim 1 wherein the active hydrogen-containing functional group is a functional group selected from the group consisting of a hydroxyl group, a mercapto group, a primary amino group, a secondary amino group and a carboxyl group.

4. The process according to claim 1, wherein the reaction is conducted in a solvent.

5. The process according to claim 1, wherein the organopolysiloxane compound is at least one member selected from the group consisting of a compound of one of the following chemical formulae (1) to

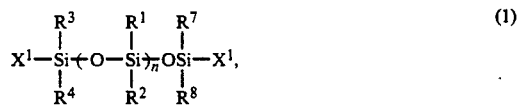

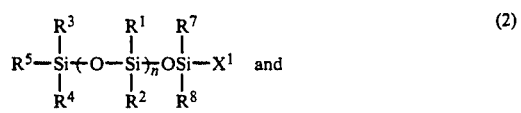

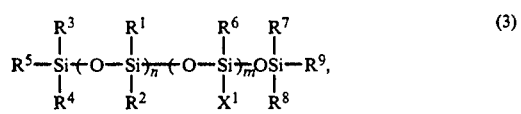

wherein $X^1$ is a $C_{3-10}$ hydrocarbon group containing at least one functional group of at least one type selected from the group consisting of —OH, —SH, —$NH_2$, —$NHR^{10}$ and —$CO_2H$, which can optionally contain an ether bond, a thioether bond or an amino bond, $R^1$, $R^2$, $R^3$, $R^4$, $R^6$, $R^7$, $R^8$ and $R^{10}$ are, respectively, the same or different $C_{1-6}$ hydrocarbon groups, $R^5$ and $R^9$ are $C_{1-18}$ hydrocarbon groups, n is 0 or an integer of from 1 to 200, and m is an integer of from 1 to 10.

6. The process according to claim 5, wherein the organopolysiloxane compound is a polydimethylsiloxane compound wherein each of $R^1$ and $R^2$ is a methyl group.

7. The process according to claim 5, wherein $X^1$ is a hydroxyalkyl group, a dihydroxyalkyl group, a hydroxyalkoxy-substituted alkyl group, a mercaptoalkyl group, an aminoalkyl group, an N-aminoalkyl-substituted aminoalkyl group or a carboxyalkyl group.

* * * * *